May 21, 1929.　　　P. YEAGER　　　1,714,337
TOOL
Filed May 28, 1927
Fig. 1.
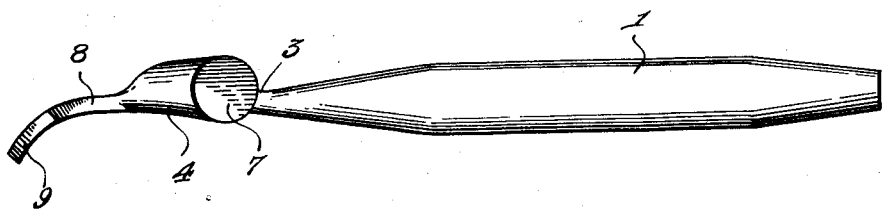
Fig. 2.
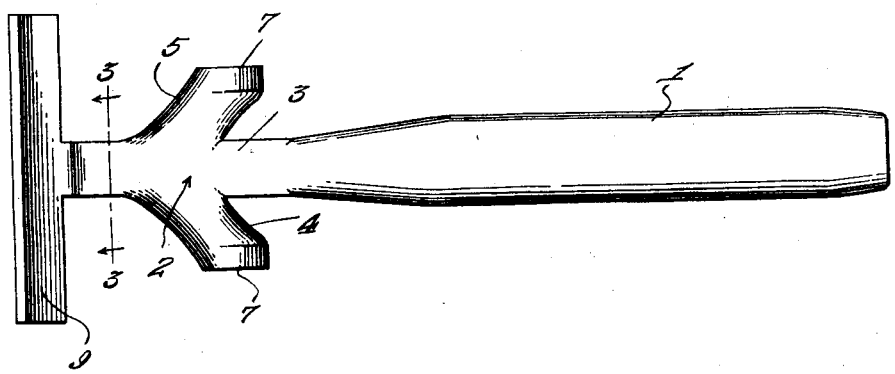
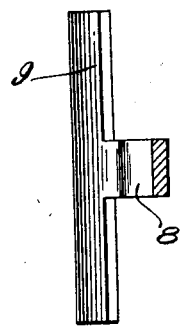
Fig. 3.
Paul Yeager, INVENTOR
BY Victor J. Evans
ATTORNEY Patented May 21, 1929.

1,714,337

UNITED STATES PATENT OFFICE.

PAUL YEAGER, OF MUSKEGON, MICHIGAN.

TOOL.

Application filed May 28, 1927. Serial No. 195,070.

This invention relates to calking tools, and its general object is to provide a tool for calking the joints of pipes and other plumbing implements regardless of the position of the joint and especially where the joint is arranged in a corner or other out of the way place where it would be practically impossible or extremely inconvenient to use the usual tool for this purpose.

A further object of the invention is to provide a calking tool of the character set forth, that is capable of producing a perfect joint in an easy and expeditious manner with very little effort on the part of the operator.

Another object of the invention is to provide a calking tool for producing a neat and tight joint for pipes and the like, that is extremely simple in construction and inexpensive to manufacture.

This invention also consists in certain other features of construction and in the combination and arrangement of the several parts, to be hereinafter fully described, illustrated in the accompanying drawings and specifically pointed out in the appended claim.

In describing my inventon in detail, reference will be had to the accompanying drawings wherein like characters denote like or corresponding parts throughout the several views, and in which:

Figure 1 is a top plan view of the tool forming the subject matter of the present invention.

Figure 2 is a side view thereof.

Figure 3 is a sectional view taken on line 3—3 of Figure 2.

Referring to the drawings in detail the reference numeral 1 indicates the handle of the tool which as shown is substantially oval shape in cross section and tapers toward one end for integral connection with the body 2 of the tool through the instrumentality of a reduced portion 3.

The body 2 is substantially arcuate shape in transverse cross section and disposed upon opposite sides thereof and arranged at an inclination with respect to the reduced portion 3 are rounded projections 4 and 5 which terminate at their outer ends in flat surfaces 7 so as to provide what may be termed hammer heads for a purpose which will be presently apparent.

Formed integral with the body 2 and arranged in alignment with the handle 1 but projecting upon the opposite side of said body from the handle is a curved arm 8 which is substantially flat and has integrally connected with its outer end a relatively long blade 9. The blade 9 is transversely curved upon itself to the same degree as the arm 8.

From the above description and disclosure of the drawings, it will be obvious that the calking tool which forms the subject matter of the present invention can be readily applied for calking pipe joints and the like with very little effort on the part of the operator, and while the tool can be used for calking joints regardless of the position of the latter, it is primarily designed for operating upon joints that are disposed in corners or other out of the way places where a tool of the usual construction could not be used with any satisfaction. In applying the tool to the joint, one of the ends of the blade 9 is inserted in the joint for packing the same and of course the end can be used to tap the packing for arranging the same in tight association with the joint, but it may be desirable to tap the uppermost head or projection with a driving implement when the pipe joint is arranged in a corner or other out of the way place and after the joint is packed in this manner and the lead or other sealing means is applied, the hammer heads may be tapped with a driving implement for packing the sealing means, as it will be obvious that it would be impossible to use a driving implement on the uppermost end of the blade if it was arranged out of reach between a wall or walls and a joint to be packed. Due to the transverse curvature of the head 9, the same will form a perfect air tight and neat joint, as the head is curved to follow the curvature of the pipe.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A calking tool of the character described comprising a tapered handle, a reduced portion formed on one end of said handle, a body formed with said reduced portion, projections extending from opposite sides of said body and providing heads to be tapped during the use of the tool, an arm extending outwardly from said body in alignment with said handle and being longitudinally curved, and a transverse curved blade formed with said arm and extending beyond the ends of the projections.

In testimony whereof I affix my signature.

PAUL YEAGER.